INVENTORS M. V. MATHEWS
H. S. Mc DONALD
BY G. E. Hirsch Jr.
ATTORNEY

1

3,422,419

GENERATION OF GRAPHIC ARTS IMAGES

Max V. Mathews, New Providence, and Henry S. McDonald, Murray Hill, N.J., assignors to Bell Telephone Laboratories, Incorporated, New York, N.Y., a corporation of New York Filed Oct. 19, 1965, Ser. No. 498,018
U.S. Cl. 340—324 14 Claims
Int. Cl. G08b *23/00;* H01j *31/06; 31/58*

ABSTRACT OF THE DISCLOSURE

The generation and display of graphic arts images on the face of a cathode ray device is simplified and improved by defining each image, within a large library of images, in terms of a number of individual elementary closed geometric patterns. Each elementary pattern, or a variation of it, is used as a building block in forming the images of the library. Instructions for each pattern, defining the manner of assembling patterns into a desired image and the necessary beam deflections, are stored and called to use in response to a signal which designates a desired image. Called instructions are converted to signals for controlling the cathode ray device. Each completed frame display may be photographed, for example, for use in type set operations or the like.

This invention concerns the generation and display of graphic arts images. More generally, it deals with the conversion of stored information, such as digital data, to appropriate analog signals for deflecting the beam of a cathode ray oscilloscope in a pattern prescribed by the stored information.

Cathode ray oscilloscopes are widely used for the display of images, such as alpha-numeric characters, or the like, in selected groups to form, for example, words, sentences or full paragraphs of text. Because of the great facility with which individual patterns may be written, erased, and rewritten on a tube screen, such devices are ideally suited to the display of information for direct observation, for use in direct, non-impact printing systems and, by means of photographic plates or the like, for impact printing applications. In those cases in which the tube beam is directed to develop each individual pattern by one or a sequence of deflections, as opposed to those cases in which the pattern is formed by extruding the beam to a predefined pattern shape, the deflection instructions are necessarily relatively complex. If a sizable number of different patterns are to be developed, a large number of individual deflection instructions must be stored.

It is the principal object of this invention to simplify the generation and display of graphic arts images.

It is another object of this invention to ease the storage requirement of a system for controlling the generation and display of graphic arts images.

It is another object of the invention to store, in compact form, descriptions of a large library of individual graphic arts images in a fashion such that the conversion of these data to analog deflection form may be carried out simply and quickly.

In accordance with the present invention, each graphic arts image in a library of images to be displayed, for example on the face of a cathode ray oscilloscope, is defined in terms of individual elementary patterns, conveniently termed "sub-areas." The sub-areas are selected, insofar as possible, as simple geometric shapes. Hence, each sub-area may be used as a building block in forming a great number of different images. A considerable saving in parameter storage requirements is achieved by

2 additionally specifying the sub-area orientation in a pattern. Merely by rotating a sub-area about a defined center of rotation or by inverting it about a defined axis, i.e., by reflecting it, the same sub-area may be made to serve an even greater alphabet of different patterns. Entire patterns may then be defined in terms of the specification of an assembly of sub-areas, each with a particular symmetry, orientation and size. Thus the loops on "b," "p," "d," and "q" of an alphabet of Latin letters of a particular type font may be identical, except for rotation and symmetry.

Similarly, in accordance with a preferred form of the invention, each sub-area, whatever its shape, is formed by a number of geometric, simple patterns, conveniently termed "patches." The patch area is used as the basis of definition of all of the sub-areas and thus of all of the images in the system library. All images are constructed from a number of connected sub-areas each of which, in turn, is constructed from a number of connected patches. By changing the values of the parameters of the patch, the overall shape, size and orientation of the patch may be altered so that it may serve in the creation of a large variety of sub-areas. In this way, the number of parameters used for specifying the image is reduced. Moreover, as with the case of sub-areas, the image code may be further simplified by designating, in lieu of a full description for each patch, the description of a "standard" patch, plus orders for its translation, rotation or inversion.

The elementary patch must meet certain requirements. It must (1) fit together with other patches without leaving interior spaces, (2) fit together with other patches to provide a good approximation to a considerable number of different sub-areas, (3) be capable of definition with a reasonable number of numerical parameters, (4) be capable of generation with reasonably simple analog deflection equipment and (5) be defined in terms that permit both magnification and minification.

In accordance with the invention, a trapezoidal area bounded by straight lines at its top and bottom and by second order curves at its sides is preferred as the basic patch shape. Such a shape meets all of the requirements outlined above. Adjacent trapezoidal patches can be fitted together on their straight sides, they may be fitted together in a variety of ways, they can be specified merely in terms of width, height, curvature and initial slope of left and right boundaries, they can be simply converted to analog deflection voltages, and they can be enlarged or reduced in size by the alteration of one or two parameter values.

Experience has shown that an average of two or three sub-areas, each with a total of about three patches, is sufficient for defining a good quality alpha-numeric character such as the letter of a Latin alphabet of a particular type font. Experience in defining patterns in terms of trapezoidal patches has also shown that the same patch definition may be used in defining a great variety of patterns, including letters with different type faces, line drawings, mathematical equations, musical manuscripts, and scientific graphs. In each case, the required storage facility is much lower than would be required to specify an equivalent alphabet of characters without the division of each pattern into each sub-area and patch components.

Deflection of a cathode ray beam is restricted to activity within basic patch areas only. Each stored numeric instruction is used to specify the correct assemblage of patches and sub-areas, which in turn control the generation of the appropriate energy for moving the tube beam to a specified location on the screen and, thereafter for tracing out connected patches to form the pattern. Execution of the specified pattern may be in the form of a half-tone image or in the form of a solid pattern. The half-tone image may be produced either by a number of modulated sweeps of the beam within the specified patch or by plotting a specified number of points within the area. An apparently solid pattern is produced by sweeping the beam continuously within a patch, for example, by a number of zig-zag sweeps.

With the system of definition employed in the practice of the invention, a large library of patterns may be created with an extremely limited number of different deflection maneuvers. Concomittantly, the deflection maneuvers may be specified simply, thus to ease the storage requirements of the system.

It is therefore another object of the invention to specify each of a large number of patterns in terms of a number of individual standard deflection limits in order to reduce the number of deflection maneuvers required for the display of the pattern.

Stated in another way, the invention improves the control of an oscillograph in the creation of individual graphic arts images by dividing each of a large library of image patterns into a selected plurality of contiguous, simple, geometric figures, by defining the spatial location and the shape parameters of each geometric figure within each pattern, by storing the defining data, and by employing the stored data to position and deflect a cathode ray beam or the like in accordance with all of the defined geometric figures which together make up a selected pattern.

Even though each pattern of an aliphabet is specified numerically in terms of connected sub-areas and patches in a fashion such that, on paper at least, filled in patches depict the desired pattern, the conversion of these data to a visual form is often accompanied by distortions which change the basic shape. For example, the geometry of a typical cathode ray oscilloscope produces, particularly at the corners of the screen, pin cushion distortions and the like, and external lens systems, used for the recording of a visual image, often give rise to optical aberrations. Such distortions and aberrations may be anticipated in the system of the present invention by specifying, in numerical form as a part of each patch definition, the requisite correction transformation from orthogonal to oblique coordinates. The transformation is performed in the image generating equipment as a function of the spatial location of the image on the display screen.

It is therefore another object of the invention to compensate for aberrations which are inherent in image display and recording apparatus associated with a numerically controlled display system.

These and other objects and features of the invention will be more fully apprehended following a consideration of the following description of a preferred embodiment of the invention when read in conjunction with the attached drawings in which.

Figures 3A, 3B, 11:
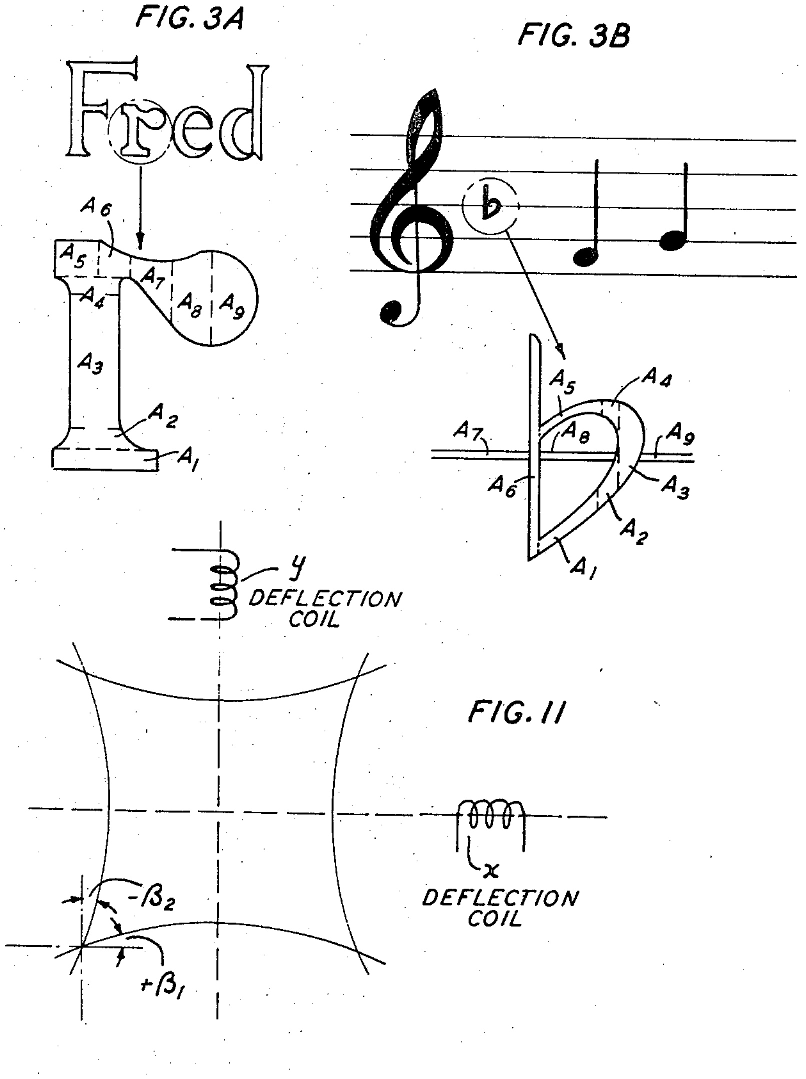
FIGS. 3A and 3B illustrate the manner in which a number of contiguous patches are used in accordance with the invention to define a pattern.
Figure 12:
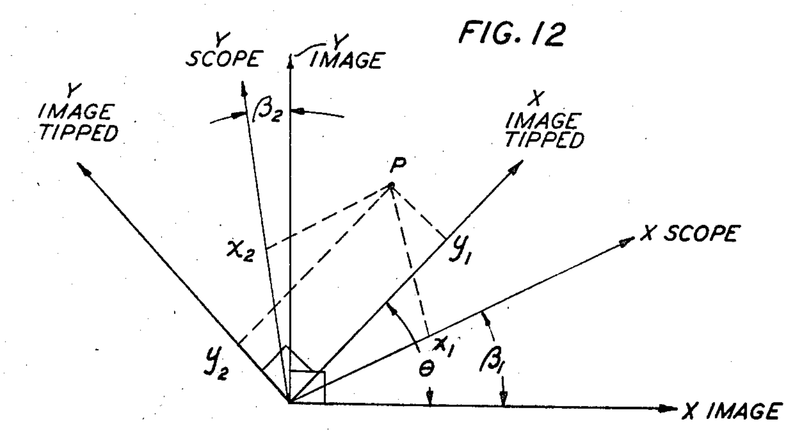
Figures 4, 7:
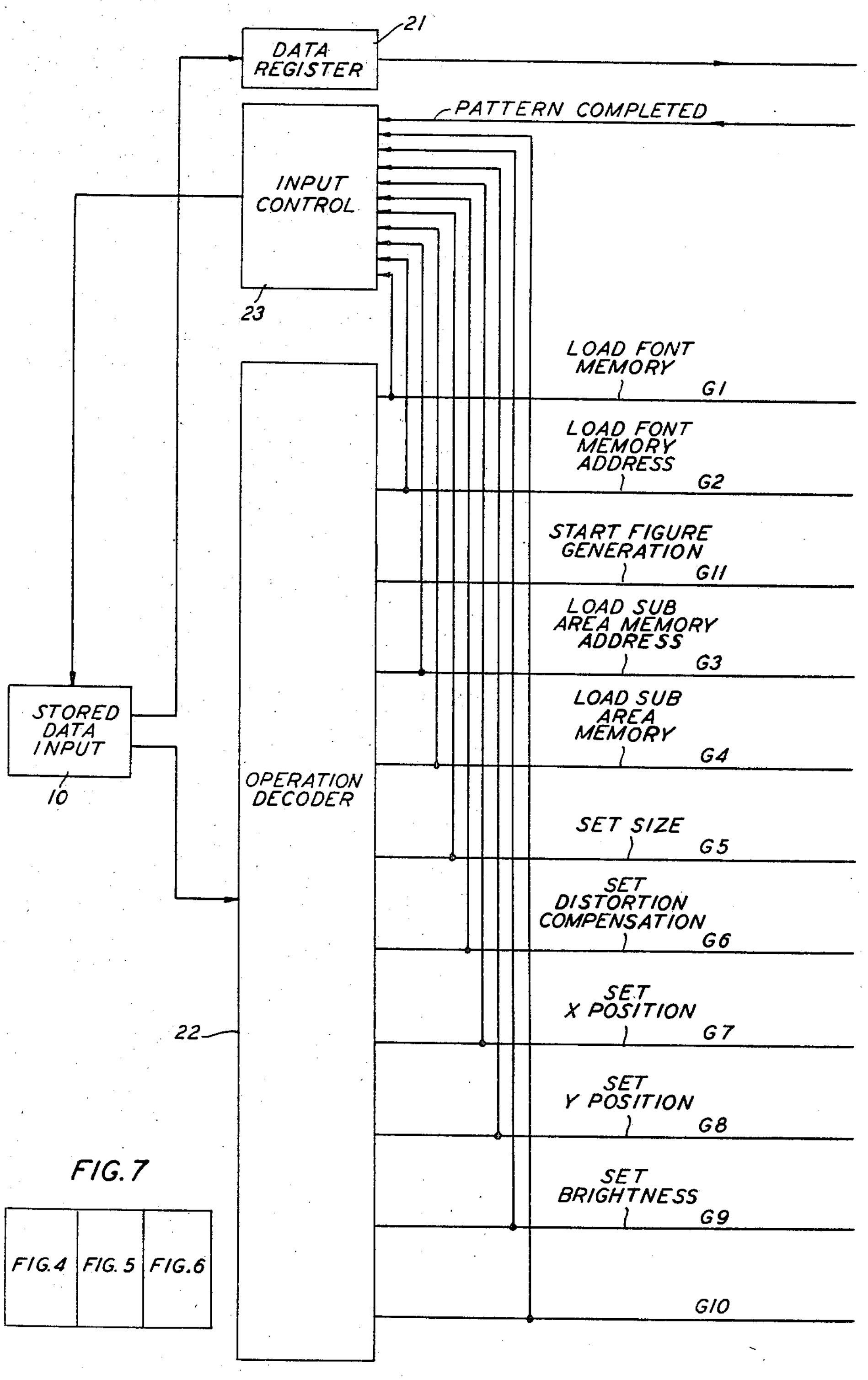
Figure 5:
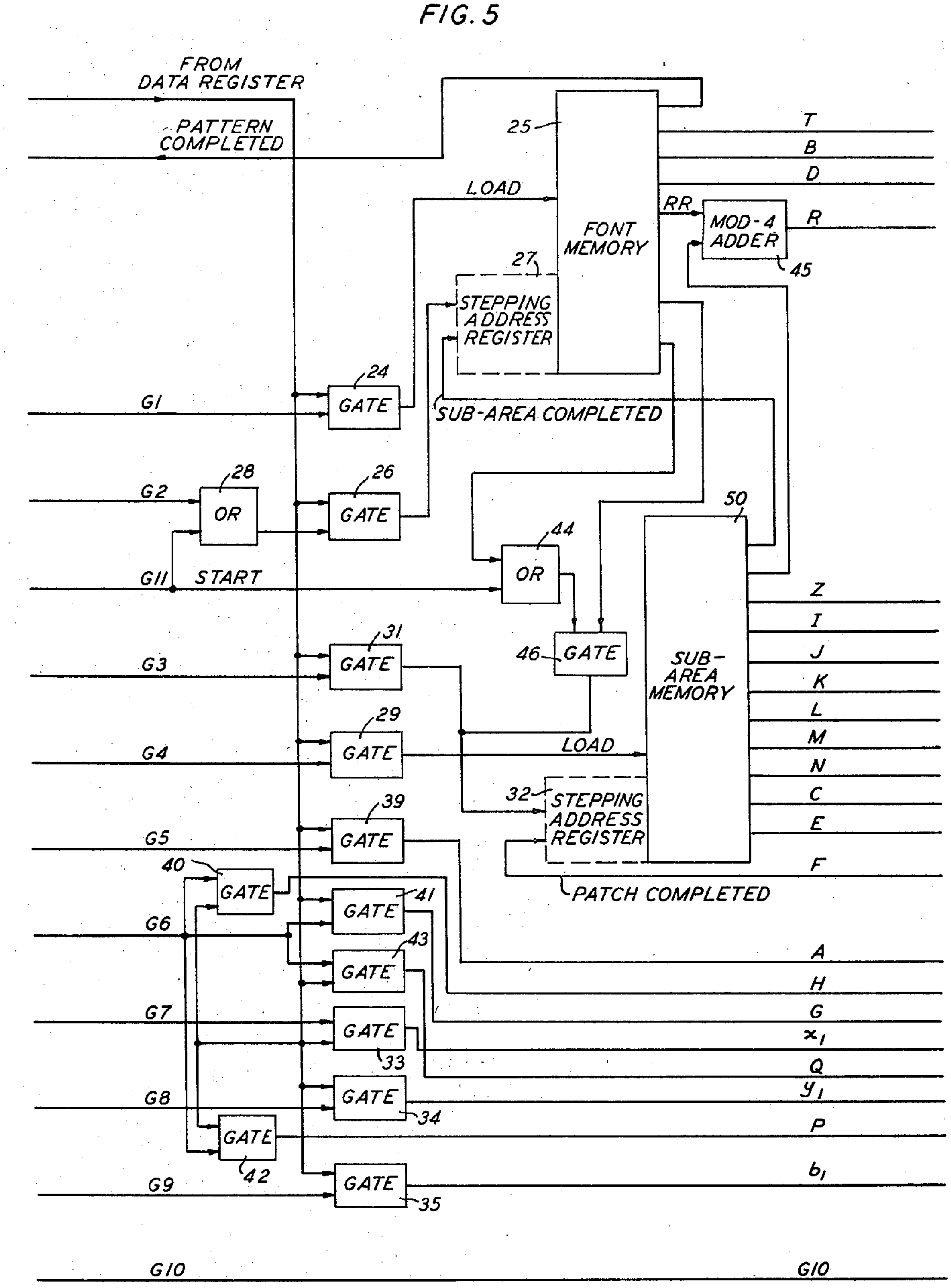
Figure 6:
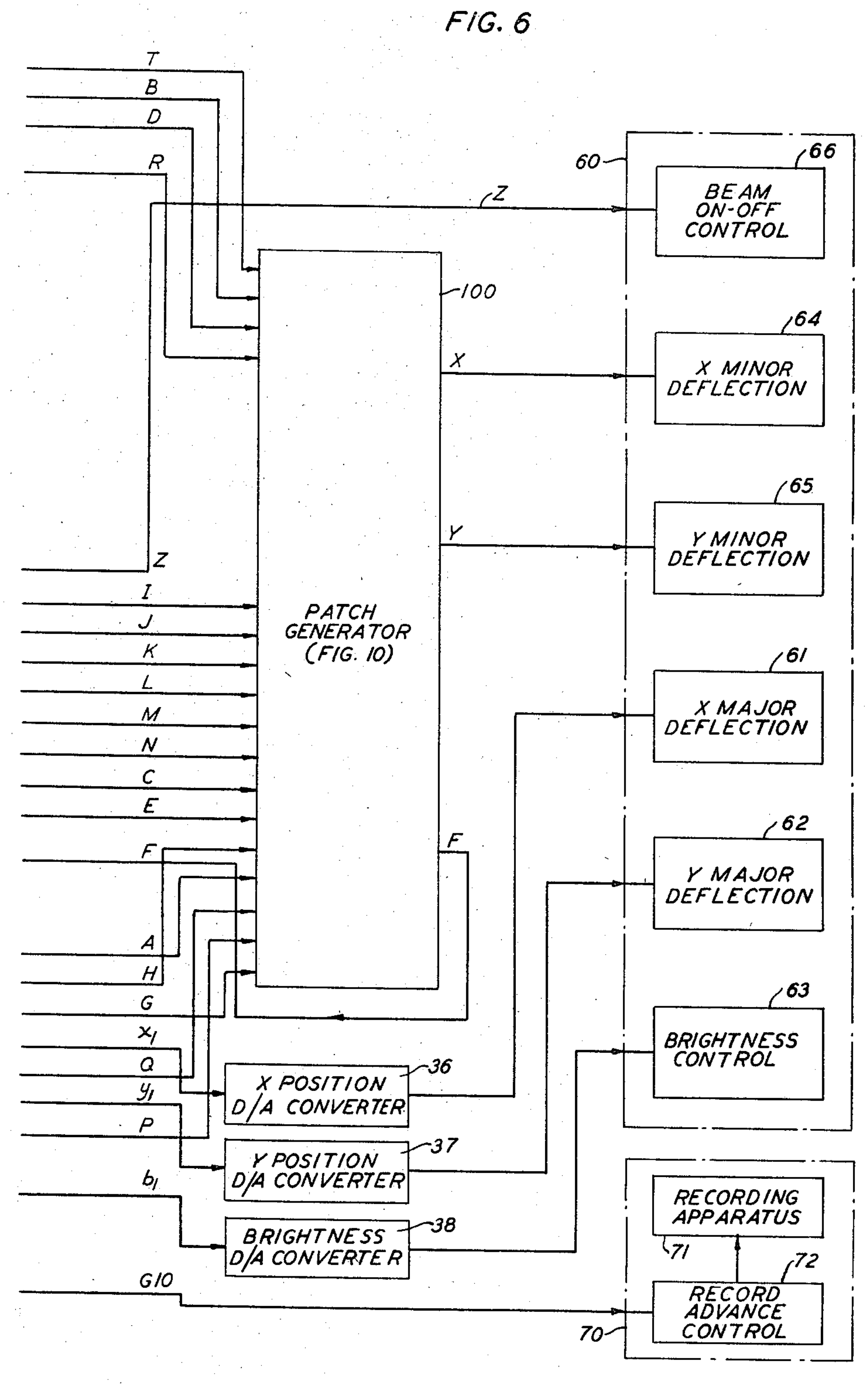
Figure 8:
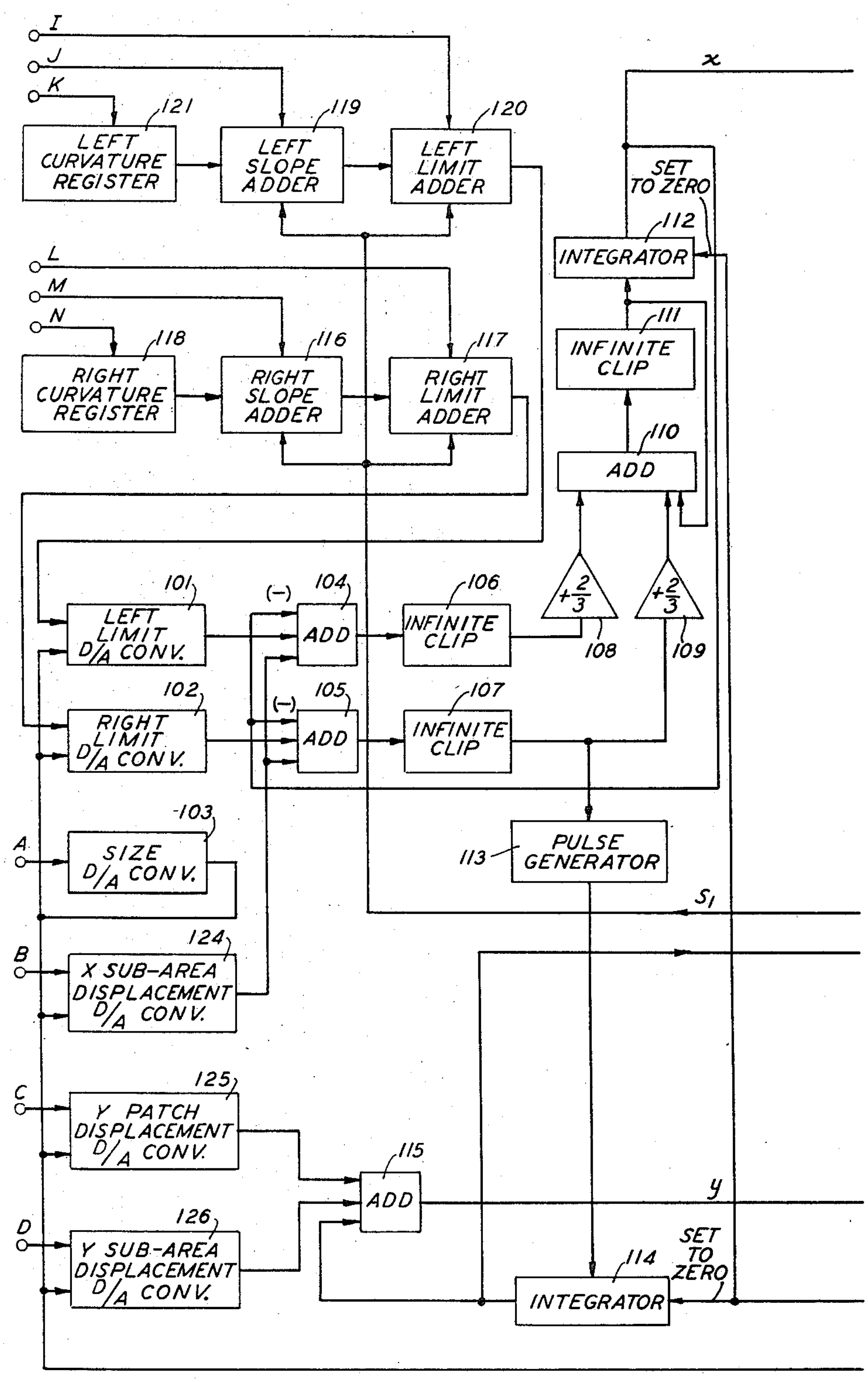
Figures 9, 10:
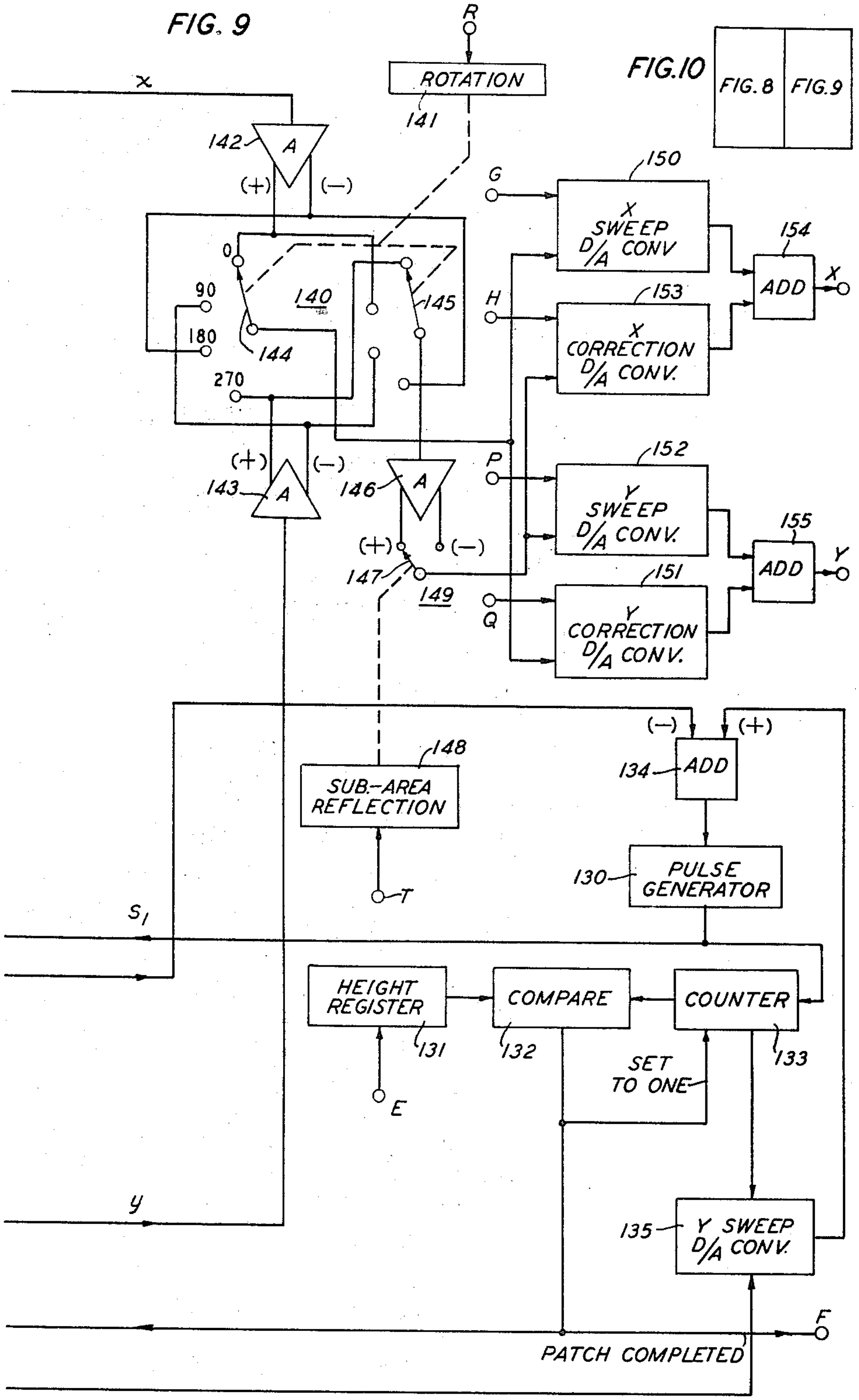

FIGS. 4, 5, and 6, assembled as shown in FIG. 7, constitute a schematic block diagram of an overall system in accordance with the invention;

FIGS. 8 and 9 assembled as shown in FIG. 10 constitute a schematic block diagram of a patch generator suitable for use in the practice of the invention;

FIG. 11 illustrates non-orthogonal deflection of a beam causing an effect known as pin-cushion distortion, and;

FIG. 12 illustrates several coordinate systems which are encountered in the display of an image on a cathode ray tube screen.

SYSTEM FUNCTION

Figure 1:
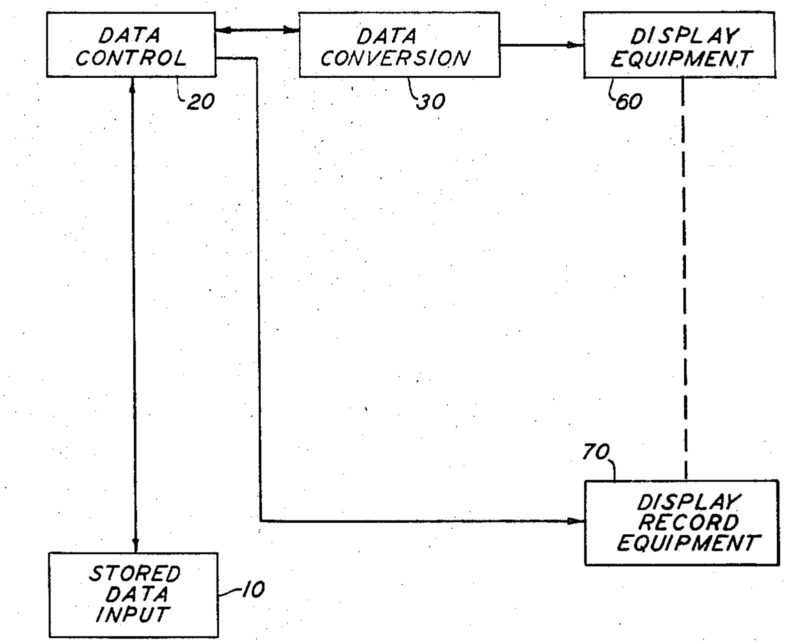
FIG. 1 is a block schematic diagram illustrating a typical system for the display and recording of graphic arts images in accordance with the invention.

A block diagram of a graphic arts image generation and display system which embodies the principles of the invention is shown in FIG. 1. Numerical data which specifies each image or pattern to be displayed, for example, an alphanumeric character, and its desired location in a complex display is entered into data input apparatus 10. For a graphical image such as a schematic figure, location data may simply be the $x$–$y$ coordinates of the pattern in the display; for alpha-numerics in running text, the starting point of the text, is ordinarily enough. (Line width and column height are known so that each letter follows the preceding one in a pre-defined order.) Text, editorial instructions, and position data may be entered by way of a typewriter or the like and stored in digital form on magnetic tape or by means of any convenient digital storage medium. If desired, apparatus 10 may be equipped with auxiliary computation equipment for analyzing the text and, as desired, for preparing a corrected, justified text. Since editorial instructions accompany each pattern, the size, form of pattern, and type font may conveniently be changed from character to character or from sequence to sequence. At any later time, these data are read out, one set at a time under the influence of data control apparatus 20, and are supplied to data conversion apparatus 30.

Conversion apparatus 30 includes a data register, a data decoder, and a system of data control. It also maintains in one memory system a record of various frequently used pattern shapes, i.e., fonts of type, in terms of a number of connected standard sub-areas. Thus, the letter "b" of a given font may be designated as comprising two sub-areas, a vertical line and a generally circularly connected loop. The letter "d" evidently comprises the same two sub-areas with the loop area being inverted and linked to the vertical line on its opposite side. Conversion apparatus 30 also maintains in another memory system a record of the individual patches required to define each such area used in the system alphabet.

As each pattern is specified by control unit 20, the sub-areas required for the pattern are identified by the "first" memory and are used to select the required sub-area parameters for the pattern. As indicated above sub-areas may be selected, as commanded by control 20, for use in any one of a number of different orientations in the final display. Data which specifies each required sub-area is thereupon transferred to the "second" memory system which maintains a record of the parameters of the patches necessary to specify each sub-area. Specified patch parameters are delivered to a "patch generation" system which converts the numerical parameters into analog form of sufficient output to actuate directly a cathode ray oscilloscope in display equipment 60. The beam of the cathode ray tube is placed at the appropriate position on the tube screen and is swept within the limits of specified patch boundaries to execute the display. One patch after another is written out until all patches and all sub-areas of the pattern have been displayed. As soon as execution is complete, data control 20 responds, momentarily arrests the beam, and calls the specification of the next pattern for display from stored data input apparatus 10.

It is convenient to record a completed display, for example a full page of typed text, on photographic film or on electrostatic plates or the like, for eventual publication by standard photo-offset printing. This is carried out conveniently by display record equipment 70. Accordingly, at the conclusion of each display, data control 20 issues a "record" signal which activates recording equipment 70 and thereafter advances the film, in the case of a camera, for the next subsequent display. Preferably, the camera shutter is left open until a full display is written on the face of the oscilloscope. It is evident that the usual camera shutter action is effectively replaced, in this mode of operation, by the off-on beam control of the system. Even sharper resolution may be obtained by employing the cathode ray beam to write directly on a film sensitive to impinging electrons, or to energize an electrostatic target. Whatever the mode of conversion from beam motion to display, the usual precautions should be taken to reduce the effects of stray light on the recording medium.

*Sud-division of pattern*

Each patch area used by conversion apparatus 30 to assemble the sub-areas of a pattern is specified numerically in terms of shape defining parameters, in terms of its coordinate position within a sub-area, and in terms of its position in the overall display. Preferably, a trapezoidal patch of the form shown in FIG. 2A is employed. It is completely defined with six numbers which specify, (1) its width $w$, (2) its height $h$, (3) its left side initial slope $s_1$ at point $x_0y_0$, (4) its right initial slope at the opposite end of the base, $s_2$, (5) its left side curvature $c_1$ and (6) its right curvature $c_2$. Such a basic figure may assume a a great many different shapes through a variation of one, two or more parameters at a time. For example, in the limiting case with zero curvature and right and left slopes of infinity (right and left reciprocal slopes of zero), a rectangle is defined. It will be further apparent that the trapezoidal patch area may be enlarged or reduced in size merely by altering one or more of its parameter values. Two additional numbers locate the patch by defining the coordinates of one selected point in the patch. Preferably, the lower left corner is located by two numbers indicating the coordinate position, namely $x_0$ and $y_0$. Variation of the two coordinate numbers thus effects spatial translation of the patch. One additional number permits the patch to be oriented in two different positions, i.e., in the $\theta=0$ degree position and the $\theta=90$ degrees position. If desired, additional numbers may be used to permit $\theta$ to be specified at other fixed values or as a continuous function. In practice, the one-number, two-position technique is used since each sub-area is specified in terms of four different rotational positions and two inversions. It has been found that with this flexibility on the sub-area level, two patch orientations suffice for most alphabets.

Figure 2B:
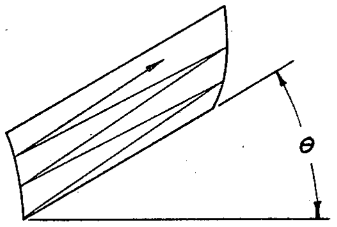
FIG. 2B illustrates a typical patch area rotated through an angle $\theta$ degrees.
Figure 2A:
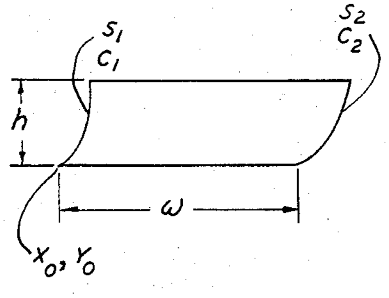
FIG. 2A illustrates a preferred "patch" shape used for defining beam motions in producing graphic arts images.

FIG. 2B indicates a trapezoidal patch rotated through an angle of $\theta$ degrees. It also illustrates the preferred zig-zag sweeping pattern of a cathode ray beam. Preferably, the zig-zag pattern is oriented with relation to the base of the trapezoidal patch. Thus, the beams follows the same defined patch limits regardless of patch orientation.

FIGS. 3A and 3B illustrate the manner in which a plurality of trapezoidal patches are pieced together within sub-areas to define the deflection limits of different patterns, e.g., a small Latin r of a prescribed type font, and a "flat" sign used in musical notations. It is evident that the trapezoidal patch shape is used in a variety of ways; it permits a great many different individual shapes to be created, each in terms of a combination of the same elemental patch shape. The areas of the patterns of FIG. 3 may, of course, be sub-divided in other ways and defined with a plurality of sub-areas and patches of different basic configurations, e.g., rectangles, triangles, or the like. It will be appreciated, however, that patch and sub-area shapes that are too stylized may give rise to an overall pattern characterized by ragged edges. In some applications this result may be acceptable and, because of the slightly smaller storage capacity required for them, might be useful.

SYSTEM OPERATION

A somewhat more detailed block schematic diagram of a system for the generation of graphic arts images in accordance with the invention is shown in FIGS. 4, 5 and 6, assembled as shown in FIG. 7.

*Control of input data*

Sequences of numerical pattern specifications, stored in unit 10 on a magnetic tape or the like, are periodically transferred in part to data register 21, and in part to operation decoder 22. That is to say, each specification is in two parts. The first, delivered to register 21, identifies the pattern to be generated for display, the desired size, the type font to be used, and the location (address) at which the pattern is to be placed in the display. The second part, an operation code delivered to decoder 22, is more or less standardized for all patterns accommodated by the system. It controls the timing and manner in which the pattern specification is put to use in the generation of a display. Its use permits a variety of auxiliary functions to be performed. For example, it permits the actual generation of a pattern to be keyed to the time required for carrying out the various memory functions of the system, and for controlling display recording equipment. Even though the sequence of operations defined by the code supplied to decoder 22 is often the same for the patterns of a particular alphabet and hence might be "built in" to the system, considerable flexibility is afforded by locking the operation code to an individual pattern specification. The technique affords an easy manner of revising the schedule of system activity for a selected pattern, or indeed for a group of patterns, without interfering with the schedule used for other patterns within the alphabet.

An accounting of completed operations is compiled by supplying signals developed on each of the output leads of decoder 22 to input control network 23. An additional signal is delivered to control network 23 upon completion of the pattern generation operation. Upon receipt of a signal, network 23 issues a signal indicating that the system is ready to accept a new set of pattern instructions. This signal is delivered to stored data input 10.

Data register 21 may be any form of short-term digital store, and operation decoder 22 is typically a logic network, or a programmer, which responds to supplied signals and issues operation signals on output leads in a prescribed sequence.

*Loading the memories*

Operation of the system is initiated by stocking the several memories with addressed records of the sub-area and the individual patches necessary for creating each pattern of the system alphabet. Thereafter, the mere specification of a particular pattern calls up the appropriate sub-areas and patches for the designated pattern. The memories are loaded by supplying the specification of a pattern to data register 21 and to operation decoder 22. The address portion of the specification is delivered to the data register and the operation code is delivered to the decoder. Immediately, the decoder issues a pulse signal on output $G_2$ which is transferred through OR gate 28 to enable AND gate 26. Consequently, the specification address available at the other input of gate 26 from data register 21 is delivered to address register 27 associated with font memory 25. Upon completion of this transfer the next data from the stored data input 10 causes decoder 22 to issue a pulse signal on line $G_1$ which enables AND gate 24. This allows data stored in register 21 pertaining to type font, size, shape and the like, to be delivered by way of gate 24 to font memory 25 where it is stored at the address previously delivered to address register 27. A similar process is used to load sub-area memory 50. For this operation, decoder 22 issues a pulse signal on line $G_3$ to enable AND gate 31 and to transfer the sub-area address from register 21 to stepping address register 32. Thereupon, a signal from the decoder on line $G_4$ enables AND gate 29 so that sub-area data from register 21 is loaded into sub-area memory 50. This sequence of events continues until data pertaining to all of the patterns in the alphabet have been stored at prescribed addresses in the font memory and all of the sub-area data necessary for assembling the patterns of the alphabet have been stored at prescribed addresses in sub-area memory 50.

*Setting parameters*

Before generating an image, a number of parameters, such as size, distortion compensation, $x$ position, $y$ position, and brightness must be supplied to the apparatus of the system. If a fixed alphabet only is to be accommodated, some of these parameters may, of course, be permanently set, i.e., they may be built into the system. However, if a wide variety of patterns are to be accommodated, it is preferable to set the parameter values for each pattern at the time that it is specified for generation. Accordingly, each parameter value is delivered from stored data input 10 to data register 21 together with an operational code delivered to decoder 22. In response to this signal the decoder supplies a signal on line $G_5$ which enables AND gate 39 and allows, at the appropriate time, the size parameter value to be delivered from data register 21, via line A, to patch generator 100. A similar process is employed to designate $x$ position, $y$ position and brightness. Decoder 22 thus issues a pulse on line $G_7$ which enables gate 33 to allow $x$ position data from register 21 to be delivered on lead $x_1$ to $x$ position digital-to-analog (D/A) converter 36. Converter 36 transforms this position information to the required analog voltage for adjusting the major deflection unit 61 of display system 60. A pulse on line $G_8$ from decoder 22 enables gate 34 and allows $y$ position information from register 21 to reach $y$ position D/A converter 37 by way of lead $y_1$. Converter 37 develops the analog voltage used for adjusting the $y$ major deflection system 62 in display unit 60. A pulse on line $G_9$ from decoder 22 delivers a brightness value from register 21 by way of AND gate 35 and line $b_1$ to brightness D/A converter 38. The resulting analog voltage is delivered to brightness control 63 of display apparatus 60.

If it is desired to compensate for distortion originating either in the display mechanism, e.g., pin cushion distortion or the like, or that which originates in associated optical equipment, the necessary alternations of character parameters are established by enabling gates 40, 41, 42 and 43 by way of a pulse from decoder 22 on line $G_6$. This permits the corresponding data compensation information from register 21 to be delivered, respectively, on lines H, G, P and Q to patch generator 100. If the particular patch to be generated is to be rotated through some continuous angle $\theta$, not equal to multiples of 90 degrees, the necessary rotation information is also included in the four distortion compensation variables delivered to the patch generator. The relation between rotation and compensation will be described more fully hereinafter in the discussion of patch generator 100.

*Image generation*

As stored data input 10 is instructed to develop a pattern, the necessary specification and operation codes are delivered to data register 21 and operation decoder 22. The operation decoder thereupon develops pulses on the lines $G_1$ through $G_{11}$ in order that the appropriate data from register 21 may be entered into the system. As soon as all of the necessary operations have been completed, input control apparatus 23 will have received the necessary pulses $G_1$ through $G_{11}$ together with a pattern-completed signal from font memory 25, and thereupon instruct data input 10 to deliver the next pattern specification.

A pulse from decoder 22 on the START figure generation lead, $G_{11}$, initiates the operation. This pulse is delivered by way of OR gate 28 and energizes AND gate 26. This permits the address of the selected pattern to be supplied from register 21 to address register 27. In addition, the START pulse enables OR gate 44 to transfer the data previously stored in the font memory, at the address established in register 27 for this pattern, to be delivered, by way of gate 46, to the stepping address register 32 associated with sub-area memory 50. The font memory contains, in a series of successive memory locations, the series of addresses in the sub-area memory which specify the sub-areas involved in the pattern to be generated. Address register 27 is now set at the first of these memory locations in the font memory. Similarly, sub-area memory 50 contains, in successive memory cells, the parameters necessary to describe the patches in a particular sub-area. Stepping address register 32 is now set at the first patch of the first sub-area in the particular pattern being generated.

In addition, font memory 25 also instructs patch generator 100 as to any necessary reflection of the sub-areas, of rotation of a sub-area, and of any desired sub-area displacement in either the $x$ or $y$ direction. These data are delivered at the specified times from font memory 25 on leads T, RR, B and D to patch generator 100. The sub-area reflection signal on lead T is preferably a one-bit signal which specifies whether the sub-area is reflected about the $y$ axis or not. Sub-area rotation information is combined with patch rotation information from sub-area memory 50 in MOD–4 adder 45. The combined signal is delivered on lead R to generator 100. In a preferred embodiment of the invention, rotation of 0, 90, or 180 degrees only are allowed. Consequently, the sub-area rotation and patch rotation signals are each two-bit signals. The output of adder 45 is likewise a two-bit signal which is sufficient to specify four different positions in the patch generator.

Sub-area memory 50 periodically delivers the data stored at the address specified by register 32 to patch generator 100. These parameter values are sufficient to define each patch shape in terms of its width, height, left and right side curvature, left and right slope, and position. Memory 50 also specifies, by way of a signal on line Z, the on-off character of the beam. This information is used to adjust beam control 66 in display unit 60. The beam is turned on only during each patch display.

Patch generator 100 thereupon proceeds to generate the analog signals for deflecting a cathode ray beam. These signals are supplied on the X and Y leads to the $x$ minor deflection system 64 and the $y$ minor deflection system 65 of display device 60. As a result the beam, previously set to a prescribed point on the display screen by the $x$ and $y$ major deflection systems 61 and 62, executes the specified patch. Upon completion of the generation, patch generator 100 issues a signal on lead F which is delivered to stepping address register 32 and advances the register to the next address location. Sub-area memory 50 then delivers a new set of patch parameters to generator 100. The next patch is then defined and displayed.

This process proceeds until the last patch in the first sub-area has been completed, at which time the next address in address register 32 causes a pulse to be produced on the Sub-Area Completed line. This pulse is delivered to stepping register 27 associated with the font memory, which, in turn, advances the address in register 27 to that of the next sub-area of the pattern. The sub-area generation process is repeated and, upon completion, address register 27 is again advanced. When the entire pattern has been developed, the next position of address register 27 causes a pulse to be issued by font memory 25 on the Pattern-Completed line. This pulse is delivered to input control 23 so that a call may be made for more data from input 10.

In specifying a new sub-area for development, data storage economy is realized by shortening the data list, i.e., the list of patch addresses, supplied to memory 50 for those sub-areas which finds use in a number of different orientations. Thus, for example, if a basic sub-area constitutes the curved portion of the letter d, and if it is desired in a pattern specification to develop the letter b, using the same basic sub-area for its curved portion, font memory 25 need only specify the basic sub-area, at the same address in memory 50 as for the letter d, with an additional bit of information concerning orientation. This bit is read out of the font memory, in this case, on lead T to indicate that the standard sub-area is to be developed but reflected about a given axis. Evidently, in the case of the sub-area used in this example, a like result could be achieved by specifying the basic patch data in memory 50 at the same sub-area address, and by additionally specifying a rotation of 180 degrees by the appropriate code on lead RR instead of a reflection. This alternative choice is, of course, restricted to certain subareas, however, the availability of the choice illustrates the great flexibility which is achieved by utilizing basic sub-area data, at a given address in subarea memory 50, for a variety of different patterns, with the requisite modification being supplied by auxiliary orientation data issued from font memory 25.

Alternatively, a similar result and a similar saving in storage capacity may be achieved by instituting a system of indirect addressing, well known to those skilled in the art. Such a technique may be carried out by employing an additional address register under the control of the stepping function of registers 27 or 32, as the case may be.

*Image display*

Display of an image by the cathode ray tube is controlled by signals X, Y, and Z. Position on the screen and brightness of a pattern are established, in the manner previously described, from analog signals supplied to the major deflection system units 61 and 62, and the brightness control unit 63. The beam is turned on at the beginning of each patch generation interval by a signal Z emanating from sub-area memory 50. The X and Y minor deflection signals, generated in a manner to be described hereinafter, are impressed on deflection elements 64 and 65 in image generator 60. In response to these deflection signals a zig-zag pattern, within defined patch limits, is produced.

If desired, the completed display may be recorded, for example, by means of recording equipment 70. Typically, a camera 71 is used. The shutter, if one is present in the camera, is opened and the beam on-off control 66 performs the shutter function. When one complete frame of the image has been displayed and recorded on the film, the film is advanced by means of an appropriate signal on lead $G_{10}$ from operation decoder 22. Alternatively, an electron sensitive film or the like may be placed directly in the path of the electron beam for direct exposure.

*Patch generation*

A block schematic diagram of a generator suitable for producing analog signals for sweeping a beam within the limits of a defined patch is shown in FIGS. 8 and 9, assembled as shown in FIG. 10. Data from font memory 25 on leads T, R, B and D, data from sub-area memory 50 on leads I through N, C and E, and data from register 21 via leads A, H, Q, P and G is available as input information for patch generator 100.

Analog signals for producing a zig-zag sweep, which moves at a constant rate from left limit of each path to the right limit and back again, are developed in the following manner. The position of the initial left limit of a given patch is specified by a signal from the sub-area memory delivered to the generator on lead I. The position of the initial right limit is specified by a signal delivered on lead L. These limit values are supplied by way of left and right limit address to D/A converters 101 and 102, respectively, wherein they are converted into analog control voltages. Size D/A converter 103, supplied with size information from data register 21 (FIG. 7) on lead A, produces an analog voltage which is multiplied or scaled in D/A converters 101 and 102 by the limit control voltages. The limit control signals are delivered via adders 104 and 105 and infinite clippers 106 and 107, respectively, to operational amplifiers 108 and 109, each with an amplification factor of $+2/3$. The adjusted limit control signals are combined in adder 110, infinitely clipped in clipper 111 and integrated in device 112 to produce sweep control signal $x$.

Assume that the signal $x$ at this instant represents a deflection of the beam proceeding from left to right, and that the beam position at the instant is at the left of the right limit, i.e., the beam is approaching the right limit. With this condition, the input to integrator 112 is positive and the beam proceeds to the right at a constant rate until it reaches the right limit. At that instant, the sign of the signal passed by adder 105 changes from positive to negative and the output of infinite clipper 107 also changes from a $+1$ to a $-1$. This change, transmitted to coordinate amplifier 109, causes the output of adder 110 to change from positive to negative, and the output of infinite clipper 111 to change from $+1$ to $-1$. The derivative of the voltage $x$ at the output of the integrator is thus reversed in polarity to indicate a change in sweep direction; the sweep is now directed to proceed from right to left.

The output of infinite clipper 111 is also an input to adder 110 so that, although the beam is directed to move to a point left of the right limit, the output of clipper 111 remains negative and the beam continues to move to the left until it reaches the left limit. At that time the output of adder 104 becomes positive and causes the output of infinite clipper 106 to become $+1$. The output of adder 110 under this condition beecomes positive and the output of infinite clipper 111 also becomes positive. The derivative of the output of integrator 112 again changes from $-1$ to $+1$ to indicate a reversal of sweep. The beam now is directed to proceed once again from left to right. The width limits of oscillation of the system are thus set by the analog output of left D/A converter 101 and right D/A converter 102. Similarly, sub-area displacement is controlled by signals supplied to adders 104 and 105 from $x$ sub-area displacement D/A converter 124.

As the voltage $x$ is developed, denoting the order of left to right and right to left deflections of the beam, a similar deflection voltage $y$ is developed to indicate the position of the beam in the "height" direction for each sweep. The position of the beam in the height or vertical direction is established initially by displacement signals C and D supplied to $y$ patch displacement D/A converter 125 and $y$ sub-area displacement D/A converter 126. The voltages produced by both of these converters are multiplied or scaled by the voltage supplied by the size D/A converter 103. The two voltages are added together in adder 115 to produce the $y$ position signal.

Each time the oscillation in the $x$ direction reaches the right limit, the change of sign which appears at the output of clipper 107 produces a signal in pulse generator 113 which is supplied to integrator 114. The integrated pulse is delivered to another input of adder 115 in order to increase the $y$ displacement position of the beam by one increment. Hence, the next deflection to the left and back to the right limit appears at the newly defined $y$ position.

As deflection of the beam progresses in consecutive $x$ sweeps, the left and right limits must be changed in accordance with the left and right slope and curvative data supplied to the system. This is carried out by actuating left and right slope adders and left and right limit adders at the time of a complete $y$ deflection cycle. A pulse on line $s_1$, supplied from pulse generator 130, initiates the action. It causes the momentary signal stored in left slope adder 119 to be added to the contents of the left limit adder 120 and, as required, the contents of left curvature register 121 to be added to the contents of the left slope adder 119. Similarly, an incremental signal from right slope adder 116 is transferred to right limit adder 117 and, as required, an increment from right curvature register 118 is delivered to right slope adder 116. The new contents of the left and right limit adders are supplied, respectively, to the left and right limit D/A converters 101 and 102. The specified alteration of the limits at each right limit of deflection produces the change in specification required for developing the curved sides of the patch. In the event that more sophisticated pattern limits are desired, e.g., second order curves, additional curvature registers may be employed. Such auxiliary registers may be controlled by data supplied from sub-area memory 50.

As scanning proceeds, the $y$ deflection voltage increases incrementally as pulses are delivered to integrator 114 at each right limit of deflection. Scanning continues until the $y$ deflection signal matches the signal stored in height register 131. The desired height of the patch is supplied to register 131 on lead E as a number proportional to the height of the patch. When a match occurs in comparator 132, a Patch-Completed signal is developed. It is supplied to the necessary units of the system via lead F and locally to reset integrators 112 and 114 to zero and counter 133 to one. A new patch specification thereupon provides a new height number to register 131 and starts a new sequence of deflections by way of the first pulse delivered from pulse generator 113 to integrator 114.

At the beginning of the generation of a patch, counter 133 is set to one. This "one" is multiplied by the output of size D/A converter 103 and changed to a voltage by $y$ sweep D/A converter 135. This voltage is supplied as the positive input of adder 134. The negative input of the adder is supplied from integrator 114. At the beginning of the development of a patch, the output of integrator 114 is zero. When a sufficient number of pulses from generator 113 have been integrated by unit 114, the output of adder 134 changes sign. This change causes generator 130 to produce a pulse, thus increasing the count in unit 133 to "two." By the action of D/A converter 135, the positive input of adder 134 is increased. The output of integrator 114 continues to increase until the output of adder 134 is again zero, thus causing another pulse to be issued from generator 130. The process continues until the patch is completed.

Deflection voltages $x$ and $y$ thus produced may be used, with sufficient amplification, to deflect the beam of a cathode ray device. However, as an aid to efficient coding, additional information is supplied in order to rotate the patch defined by the $x$–$y$ information and to reflect it about a given axis. Accordingly, these signals are interchanged by way of switch 140. Switch 140, shown schematically as a mechanical 2-pole, 4-position switch, is controlled by rotation signals received on lead R. The necessary conversion of this data to the form necessary for actuating the switch is carried on in unit 141. Evidently any form of diode matrix or the like may be employed; the mechanical switch is shown for simplicity.

Amplifier 142 delivers the $x$ signal in either of two polarities to a selected terminal in each deck of the switch. Similarly, amplifier 143 supplied $y$ signals in either one of two polarities to selected terminals of the switch. The outputs of the switch are carried by the wiper arms which are coupled together and rotated by mechanism 141. With the 4-position switch shown, the patch may be rotated through either 90, 180, 270 or 360 (0) degrees. A 2-bit input signal at R is sufficient for these four degrees of rotation. Thus, for example, with the switch in the position shown, the positive $x$ voltage is available at the output of wiper arm 144 and the positive $y$ voltage is available to the output of wiper arm 145. This position may be designated zero (360 degrees). For 90 degree rotation, wiper arm 144 selects the negative $y$ voltage, and wiper arm 145 selects the positive $x$ voltage, and so on.

Reflection of a patch is achieved by inverting the polarity of the signal selected by wiper arm 145. This is achieved (conveniently and schematically) by passing the signal from wiper arm 145 of switch 140 to amplifier 146 to produce two polarities of the selected signal. The appropriate polarity is selected by way of switch 149 under control of the reflection signal present at lead T. As before, the 1-bit signal on lead T is converted by apparatus 148 into a suitable signal for actuating wiper arm 147 of switch 149. Ordinarily this switch is an active network or the like.

A further modification of the $x$ and $y$ deflection voltages is preferably made in order to compensate for distortions which are imparted to the display, either by virtue of the image display system, or the optical system associated with it. So-called pin-cushioning or barrel distortion associated with a cathode ray display system is characterized by $x$ and $y$ deflection axes that are not perpendicular to one another. The deflection is not proportional to the deflection voltages applied and, in a small area deflections introduced by small motions in the $x$ and $y$ directions are not orthogonal. An illustrative case of severe distortion is shown in FIG. 11. In the figure, it is assumed that the deflection voltages applied to the system specify orthogonal deflection in both the $x$ and $y$ directions. It will be noted, however, particularly at the corners of the pattern, that the slope of the $x$ and $y$ deflections is non-orthogonal.

Distortions introduced by the lack of proportionality in the beam deflection system are corrected, as previously discussed, by the appropriate choice of parameters for the $x$ and $y$ position D/A converters 36 and 37 of FIG. 8. Correction of the non-orthogonality is accomplished in accordance with the invention, by adding small amounts of the $y$ deflection voltage into the $x$ deflection channel, and small amounts of the $x$ deflection voltage into the $y$ deflection channel. A system of interconnected D/A converters carries out the transformation from oblique to orthogonal coordinates. Accordingly, the signal present on wiper arm 144 of switch 140 is supplied as one input to $x$ sweep D/A converter 150 and as one input to $y$ correction D/A converter 151. Similarly, the voltage present on wiper arm 145 of switch 140 (or, if desired on wiper arm 147 of switch 149) is supplied as one input of $y$ sweep D/A converter 152, and as one input to $x$ correction D/A converter 153. The outputs of the $x$ converters 150 and 153 are combined in adder 154 to produce the corrected X deflection signal and the outputs of $y$ converters 151 and 152 are combined in adder 155 to produce the corrected Y deflection signal.

Sweep and correction converters 150 through 153 perform the necessary geometric conversions to re-establish orthogonality of the $x$ and $y$ axes. The necessary correction data is supplied from operation decoder 22 via leads G, H, P and Q as indicated. FIG. 12 illustrates in graphical form the relation of the several sets of axes controlled by the sweep and correction converters. In the figure, "X image" and "Y image" represent the ideal orthogonal axes for the generation of a patch, Ideally, the zigzag sweep is developed parallel to the $x$ axis. "X scope " and "Y scope" represent distorted, non-orthogonal axes which result from deflection in a non-ideal system. Angles $\beta_1$ and $\beta_2$ specify the distortion angles. "X image tipped" and "Y image tipped" represent a set of ideal, orthogonal axes which differ from "X image" and "Y image" by an angle $\theta$. It is apparent that by the suitable choice of coefficients for the correction and sweep converters, the patch may be rotated through a continuous angle $\theta$.

The necessary coefficient for effecting rotation of the deflection voltages to correct the distortion angles $\beta$, i.e., to reduce $\beta$ to zero, or to promote rotation, i.e., to set $\theta$ to some specified angle, are developed as follows. The coordinates $x_1$, $x_2$ of a point P specified in the X, Y scope system are translated into the coordinates $y_1$, $y_2$ of a point specified in the X, Y image tipped system by relating the scope system coordinates to the tipped system coordinates as follows:

$$\text{X Scope}=\frac{\cos(\theta-\beta_2)}{\cos(\beta_1-\beta_2)}\times-\frac{\sin(\theta-\beta_2)}{\cos(\beta_1-\beta_2)}y \qquad (1)$$

$$\text{Y Scope}=\frac{\sin(\theta-\beta_1)}{\cos(\beta_1-\beta_2)}\times+\frac{\cos(\theta-\beta_1)}{\cos(\beta_1-\beta_2)}y \qquad (2)$$

In the equations, $\beta_1$ and $\beta_2$ represent errors in orthogonality of the $x$ and $y$ axes, $\theta$ represents the rotation angle selected for the pattern, and $x$ and $y$ represent point positions in the tipped image coordinates. Hence, $x$ sweep converter 150 is programmed to develop an output proportional to $$\frac{\cos(\theta-\beta_2)}{\cos(\beta_1-\beta_2)}$$

and $x$ correction converter 153 is programmed with the factor $$\frac{\sin(\theta-\beta_2)}{\cos(\beta_1-\beta_2)}$$

Similarly, $y$ converter 151 is arranged to modify applied signal by the factor $$\frac{\sin(\theta-\beta_1)}{\cos(\beta_1-\beta_2)}$$

and converter 152 to supply correction by the factor $$\frac{\sin(\theta-\beta_1)}{\cos(\beta_1-\beta_2)}$$

With these coefficients supplied to converters 150 through 153, the necessary corrections are developed so that output signals X and Y will produce non-distorted images built up of connected patches in the system display unit.

It will be appreciated by those skilled in the art that the principles of the invention have been described in terms of an essentially analog implementation. Since input data is ordinarily supplied in digital form, the system necessarily employs a number of D/A converters and the like. It is equally evident that all of the operations employed to turn the principles of the invention to account may be carried out entirely on a digital basis. In practice, this is generally done; for simplicity of explanation, the analog approach is preferred.

The system has further been described on the basis of pattern generation in terms of one defined patch shape. It is apparent, however, that the shape of the elementary patch may be varied either as a variation of a trapezoid by the interchange of additional specifying parameters or as an entirely different shape. Moreover, a variety of different elemental patch shapes may be employed in the same system to increase even further the size of the alphabet that may be accommodated by the system. The same holds true for the number and complexity of the sub-areas which may be accommodated by the system. As the variety and number of the sub-divisions of the pattern increase, of course, the specifiction of the pattern and the apparatus necessary for interpreting it and converting it to signals for display increase proportionally.

The above-described arrangements, are, therefore, merely illustrative of the application of the principles of the invention. Numerous other arrangements may be devised by those skilled in the art without departing from the spirit and scope of the invention.

What is claimed is:

1. Apparatus for controlling the deflection of a cathode ray beam which comprises,
   - a cathode ray device responsive to deflection signals,
   - means for storing scanning instructions for each of a plurality of variations of a closed geometric pattern common to each of a plurality of different graphic arts images,
   - means for storing a record of those of said stored pattern scanning instructions which together define each of a plurality of different graphic arts images,
   - means for specifying one of said plurality of graphic arts images for deflection,
   - means responsive to said specification for developing deflection signals from those pattern scanning instructions which together define said specified image, and
   - means for supplying said developed signals to said cathode ray device.

2. Apparatus as defined in claim 1 wherein said closed geometric pattern is selected to be trapezoid-like and defined in terms of base length, height, and initial slope and curvature of each side.

3. Apparatus as defined in claim 1 wherein said means for developing deflection signals comprises,
   - means for developing a sequence of analog signals for deflecting the beam of said cathode ray device in a sequence of substantially straight, bi-directional scans within defined limits in the field of said cathode ray device.

4. A system for developing spatial presentations of selected patterns in response to applied code signals which comprises, in combination:
   - a cathode ray display system;
   - means for developing deflection energy for said cathode ray display system;
   - said developing means including, means for storing deflection defining instructions for each of a plurality of variations of a simple closed geometric figure,
   - means responsive to an applied code signal for controllably altering said instructions for selected ones of said geometric figures, and means for storing a record of those of said instructions which together are necessary for defining the deflection limits for each of a number of selected patterns; and means responsive to an applied code signal for employing selected ones of said instructions for controlling deflection within the limits defined for a selected pattern.

5. A system as defined in claim 4 wherein said instructions for each of said plurality of simple closed geometric figures are stored as a plurality of parameter values of a trapezoid-like figure, said parameters including the base length, height, and initial slope and curvature of each of the sides of said trapezoid-like figure, and
   - wherein said means for altering said instructions includes means for varying the magnitudes of selected ones of said parameters.

6. A system as defined in claim 5 wherein said applied code signals are in the form of sets of digital pulses representative of
   - (1) the address in said storing means of said plurality of parameters for each of said plurality of geometric figures, and
   - (2) deflection voltage control instructions for altering the values of selected parameters of said geometric figures at selected ones of said addresses.

7. A system as defined in claim 5 wherein said means for controllably altering said instructions for selected ones of said geometric figures includes,
   - means further responsive to an applied code signal for altering the spatial position and orientation of said selected trapezoid-like figures in said pattern display.

8. A system as defined in claim 7 wherein said selected trapezoid-like figures are oriented in response to said applied code signal through rotation about a defined point in each of said trapezoid-like figures.

9. A system as defined in claim 7 wherein said selected trapezoid-like figures are oriented in response to said applied code signal through reflection about an axis defined for each of said trapezoid-like figures.

10. In combination with the apparatus defined in claim 4, means further responsive to said code signal for developing distortion correction signals, and means for employing said distortion correction signals further to control the generation of analog signals for deflection.

11. In combination:

means for developing graphic displays in response to applied coordinate position defining signals;

a source of code signals;

means for converting said code signals into predefined sequences of coordinate position defining signals, each of which defines the limits of a plurality of plane closed patterns, selected combinations of which define a single graphic display;

means responsive to said code signals for transferring said coordinate position defining signals to said developing means;

means for recording graphic displays produced by said developing means; and means for controlling the application of code signals to said converting means and to said transfer means.

12. A pattern display generation system which comprises, the combination of, means for defining by a set of parameter values the shape and size of each of a plurality of similar closed sub-area figures, each of which defines a part of each of the patterns in an alphabet of related patterns, means for storing one set of said parameter values at each of a plurality of different addresses, means responsive to a set of parameter values for generating an analog signal of a value and duration sufficient to deflect the beam of a cathode ray device in a pre-defined pattern, and means for supplying code signals for initiating the generation of a display of a selected pattern of said alphabet, said code signal including a specification of the addresses of those sets of parameter values necessary for developing the analog deflection signals for said selected pattern, and further including instructions for altering selected ones of said parameter values.

13. In a pattern display generation system, the combination of:

means for storing sets of parameter signals at discrete addresses, means for delivering to each address of said storing means sets of parameter signals, each of which defines the size and shape of a simple bounded geometric figure common to each character in an alphabet of alpha-numeric characters in each of a plurality of different fonts, means responsive to sets of parameter signals for generating analog signals of a value and duration sufficient to deflect the beam of a cathode ray device in a pre-defined pattern, a source of character defining code signals, each of said code signals including a specification both of the addresses of those sets of parameter signals necessary for developing deflection signals for one alpha-numeric character and instructions for altering selected ones of said parameter signals, means for supplying said code signals to said storing means to effect the non-destructive delivery of selected sets of parameter signals to said generating means, means associated with said generating means for altering said selected ones of said parameter signals in accordance with said supplied code signals, a cathode ray display device, means for delivering analog signals developed by said generating means to said cathode ray display device for deflecting the beam thereof to produce pattern displays corresponding to the characters defined by said code signals, and means for converting selected displays produced by said cathode ray display device into a relatively permanent display.

14. In a system for controlling an electron beam, the combination of:

means for storing deflection instructions for a plurality of simple bounded geometric figures;

means for storing a record of those of said deflection instructions which together define the limits of each pattern in an alphabet of patterns in terms of selected combinations of said simple bounded geometric figure; and means responsive to an applied pattern designation signal for employing that combination of deflection instructions defined for said designated pattern in said alphabet to deflect said electron beam within the limits defined by said combination of deflection instructions.

References Cited

UNITED STATES PATENTS

| | | | |
|---|---|---|---|
| 3,283,317 | 11/1966 | Courter | 340—324.1 |
| 3,309,692 | 3/1967 | Wilhelmsen | 340—324.1 |
| 3,335,315 | 8/1967 | Moore | 340—324.1 |
| 3,335,416 | 8/1967 | Hughes | 340—324.1 |
| 3,351,929 | 11/1967 | Wagner | 340—324.1 |

JOHN W. CALDWELL, *Primary Examiner.*

A. J. KASPER, *Assistant Examiner.*

U.S. Cl. X.R.

340—172.5; 315—18; 178—6.8